April 21, 1964  P. P. SOROKIN ETAL  3,130,254
OPTICAL MASER HAVING TERMINAL LEVEL ABOVE GROUND STATE
Filed Dec. 5, 1960  4 Sheets-Sheet 1

INVENTORS
PETER P. SOROKIN
MIREK J. STEVENSON
BY *John E. Dougherty Jr*
ATTORNEY

United States Patent Office 3,130,254
Patented Apr. 21, 1964

3,130,254
OPTICAL MASER HAVING TERMINAL LEVEL
ABOVE GROUND STATE
Peter P. Sorokin, Chappaqua, and Mirek J. Stevenson,
Briarcliff Manor, N.Y., assignors to International Business Machines Corporation, New York, N.Y., a corporation of New York
Filed Dec. 5, 1960, Ser. No. 73,878
24 Claims. (Cl. 88—1)

The present invention relates to masers and, more particularly, to optical masers which depend for their operation upon the properties of trivalent uranium.

The term optical maser is used to describe devices which, by stimulated fluorescent emission produce radiation in the infrared, visible and ultraviolet portions of the electromagnetic wave spectrum. Devices of this type are capable of producing radiation which is highly directional, monochromatic and coherent. In recent years, a large amount of research and development work has been expended in attempting to develop devices of this type, as is evidenced by the patent and publications cited below.

U.S. Patent No. 2,929,922, issued March 22, 1960, to Schawlow et al. Schawlow and Townes, Physical Review, vol. 112, page 1940 (December 1958). T. H. Maiman, Nature, vol. 187, page 493 (August 1960).

T. H. Maiman, British Communications and Electronics, vol. 7, page 674 (1960). R. J. Collins et al., Physical Review Letters, vol. 5, page 303 (October 1960).

However, up to this point, only one satisfactory optical maser has been developed. The maser material utilized is ruby and produces, by stimulated emission, outputs in the visible portion of the light spectrum, specifically, in the red, having a wavelength of about 6940 angstroms.

By proper design of the maser cavity formed by the ruby crystal, it is possible to produce not only monochromatic radiation at this wavelength, but also radiation which is coherent and highly directional.

However, no optical masers have been available which are capable of producing outputs at other than this particular frequency. Further, in the operation of the ruby maser, the fluorescent transition stimulated to produce the desired emission terminates in the ground stated and, therefore, it is necessary to supply a very high intensity input pumping energy to produce the desired stimulated emission.

In accordance with the principles of the present invention, improved stimulated emission devices are provided which are capable of producing monochromatic, coherent and highly directional outputs at wavelengths which were not previously realizable and, further, to produce such outputs with a much smaller amount of input energy being supplied to the maser device. These inputs are achieved by utilizing to advantage the properties of trivalent uranium, which, when used as an impurity or doping agent in a proper crystalline host lattice, provides improved maser operation. More specifically, crystals doped with trivalent uranium exhibit strong absorption bands in the visible portion of the spectrum and, therefore, may be pumped easily with sources of visible light; trivalent uranium doped crystals exhibit extremely sharp fluorescent lines, thereby enabling achievement of maser operation; trivalent uranium doped crystals exhibit fluorescent transitions between two energy states, both of which are above the ground state for the trivalent uranium ions in the material, thereby lessening by a large amount the input energy required to initiate stimulated emission in the crystalline material. Further, trivalent uranium doped crystals may be fabricated so that the fluorescent line, at which the stimulated emission is produced, is in the infrared range.

More specifically, in accordance with the principles of the present invention, crystalline materials having a cubic symmetry and, therefore, an isotropic index of refraction have been found to be particularly adapted to maser applications when doped with small amounts of trivalent uranium. The cubic symmetry is advantageous since, with crystalline material having an isotropic index of refraction, it is possible to fabricate large crystals in the geometries in which oscillations can be produced in a desired mode without appreciable losses, even though there be some disorientation of the crystal in the cavity geometry. The alkaline earth fluoride, which include calcium fluoride, barium fluoride, and strontium fluoride, have been found to be particularly suitable host crystals, into which trivalent uranium is introduced as an impurity to produce improved stimulated emission type devices. A specific example, calcium fluoride, when doped with small amounts of trivalent uranium, is capable of producing a very high intensity monochromatic, coherent light output in the infrared region which requires for the production of the output only a relatively small amount of input pumping energy.

Therefore, it is an object of the present invention to provide improved stimulated emission type devices, more particularly, devices of the type which are termed optical masers.

Another object is to provide an optical maser capable of producing an output in the infrared.

Still another object is to provide an optical maser requiring only a relatively low amount of input energy to produce stimulated emission, and oscillation in a maser cavity.

Still another object is to provide improved optical masers which produce outputs in the form of monochomatic coherent light by stimulated transitions in the crystalline material of ions between the two energy states, both of which are above the ground state for the ions in the material.

Still another object is to provide improved optical masers employing crystals doped with trivalent uranium.

A further object is to provide improved optical masers of the above described type wherein the host crystal is cubic.

It is a still further and more specific object to provide improved optical masers formed of crystals of one of the alkaline earth fluorides, that is, calcium fluoride, strontium fluoride and barium fluoride, doped with a small amount of trivalent uranium.

The foregoing and other objects, features nad advantages of the invention will be apparent from the following more particular description of preferred embodiments of the invention, as illustrated in the accompanying drawings.

Figure 1:
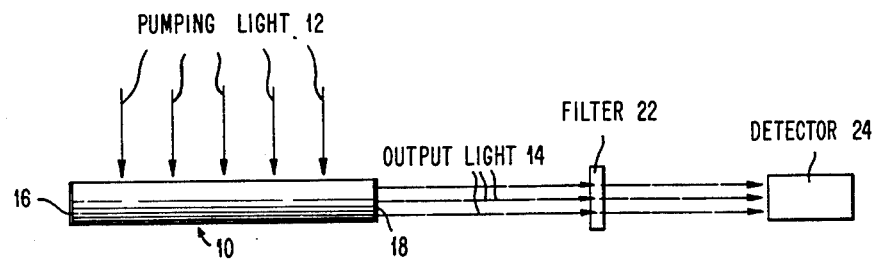
FIG. 1 is a schematic diagram of an optical maser used as a generator.
Figure 2:
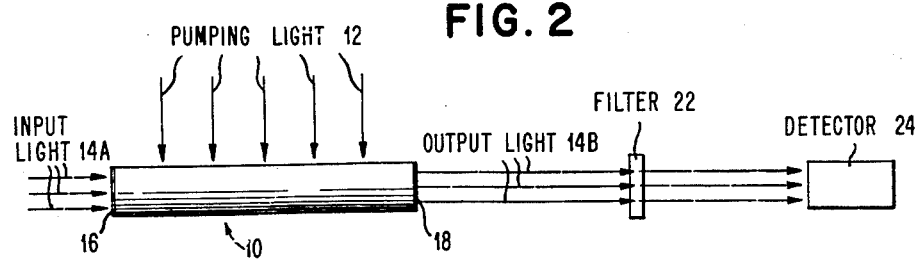
FIG. 2 is a schematic diagram of an optical maser used as an amplifier.
Figure 3:
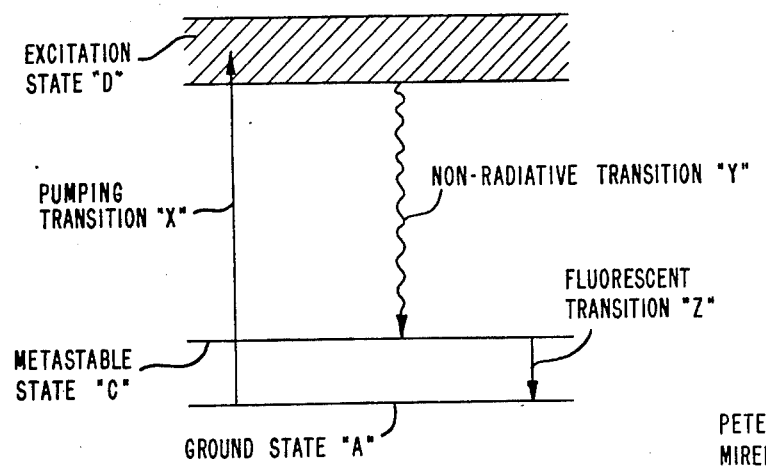
FIG. 3 is an energy level diagram indicating the transitions which occur top roduce optical maser operation in a material wherein the stimulated emission transition terminates in the ground or lowest energy state for the ion in the material.

Now referring to the drawings in detail, FIGS. 1 and 2 show optical maser devices used in application shown in the prior art. The energy level diagram of FIG. 3 is representative of the internal operation of prior art maser devices, such as ruby masers. These figures are included and a detailed description of their operation is given both to illustrate applications in which optical masers have been used, and to provide a basis for a clearer understanding of the basic principles of optical maser operation in general, and of the invention to which this application is directed.

FIG. 1 shows an embodiment of an optical maser used as a generator of electromagnetic waves. In this figure, 10 generally designates the optical maser cavity to which input pumping light, represented by the arrows 12, is applied to produce an output, represented by the arrows 14, which is both coherent and monochromatic. The cavity 10 is cylindrical in shape and is provided at opposite ends with reflective surfaces 16 and 18. Each of these surfaces is made to reflect some 98½% of the light incident thereon, and to transmit approximately 1.5% of the incident light. Where the device is to be used solely as a generator, reflecting surface 16 may be completely opaque.

The cavity 10 may be formed of a crystal such as ruby, as taught by the prior art, or of a material of the type to which the present invention is directed. Also it has been proposed to construct maser cavities using a tubular container containing a vapor having the characteristics required to produce the optical maser effect.

The manner in which optical maser devices operate may be best understood by considering FIG. 3, which is a diagram illustrating the energy states within the maser material, as well as the various transitions which occur to produce the optical maser action. In this figure, three different energy states for the ions present in maser material are shown, specifically, a ground state A, a metastable state C and an excitation state D, which is really a broad band of states into which ions can be relatively easily pumped from the ground state. When the maser material is in the quiescent state, that is, in the absence of pumping, essentially all of the ions in the material are in the ground state A. When the pumping input, represented by arrows 12 in FIG. 1, is applied, certain of these ions undergo a pumping transition illustrated by the arrow X to the excitation band D. In order for this transition to occur, the pumping light applied as an input must include light at the frequency necessary to pump ions from ground state A to the excitation band D. This frequency is determined by the absorption characteristics of the maser material and it is preferable if this frequency is in the visible portion of the spectrum. During this pumping operation from ground state A to the excitation state or band D, energy is absorbed in the maser material. The ions, once they are pumped into the excitation band D, undergo a non-radiative transition represented by arrow Y to a metastable state C. By non-radiative, it is meant that during this transition, no fluorescence is produced, but rather, the energy associated with the transition is dissipated in lattice vibrations within the crystalline material. The ions in the metastable state C, after this non-radiative transition, then go through a fluorescent transition, represented by the arrow Z, back to the ground state A. During this transition, a light output is produced at a frequency determined by the fluorescent characteristics of the maser material. For example, the energy level diagram of FIG. 3 in which the fluorescent transition terminates in the ground state A is the type of transition utilized in ruby masers of the prior art which produce outputs at a wavelength of about 6940A.

As long as the input pumping light is maintained below a predetermined threshold, the number of ions pumped to excitation state D, which then undergo a non-radiative transition Y back to state C and finally a fluorescent transition Z back to the ground state, is too small to produce stimulated emission in the crystal and oscillation in the cavity. The output produced by the material under these conditions is referred to as spontaneous emission.

When, however, the pumping light input is increased to an intensity above a predetermined threshold, sufficient ions are moved from the ground state A through excitation state D and to metastable state C, and undergo fluorescent transitions between this state and the ground state A to produce stimulated emission of further ions between these two states. When this stimulated emission is sufficient to overcome losses in the cavity, oscillations between surfaces 16 and 18 build up to produce a high intensity monochromatic coherent light output as represented by the arrows 14 in FIG. 1. This phenomenon necessary for the optical maser effect, which is referred to as stimulated emission, is achieved when a sufficient population inversion is achieved between the low energy ground state A and higher energy metastable state C. When the pumping input produces a sufficient amount of this stimulated emission, light at the characteristic wave-length propagating in a mode between surfaces 16 and 18 actually picks up energy as it propagates. When this occurs, oscillations in this mode occur to build up high intensity, monochromatic, coherent light in the cavity.

The minimum requirement for producing this oscillation is, as stated above, that there be a population inversion between the states A and C, sufficient to overcome losses in the cavity. The maser material in its quiescent state has practically all of its ions in its low energy or ground state A. In order to achieve a population inversion, that is a condition where there are more ions in the higher energy state C than in the lower energy ground state A, it is necessary that the population of the ground state A be depleted and the population of the metastable state C be increased. This is accomplished by the pumping operation, whereby the ions are pumped to the excitation state D from which they leak back in non-radiative transitions to the metastable state C. Each of these ions then undergoes a fluorescent transition from state C to state A, producing a light output at a frequency characteristic of transitions between these two states. This light energy at this frequency, once produced, is available to stimulate further transitions between the same two states C and A. These transitions may be from the ground state A to the metastable state C which is an absorption type transition or from the metastable state C to the ground state A to produce still more fluorescence. As the population of state C, relative to state A, is increased by the application of the pumping energy, the probability is also increased that the further transitions from state C to state A will be further fluorescent transitions, producing more light, rather than absorption transitions. When this population inversion reaches the point that the stimulated fluorescent radiation between states C and A have sufficient power to overcome any losses in wave propagation longitudinally between and at reflecting surfaces 16, 18 and oscillations occurs and continues in the crystalline maser.

As stated above, each of the transitions from state C to state A is at a particular frequency determined by the material itself and, therefore, the light propagating in the maser of FIG. 1, between electrodes 16 and 18, is at this particular frequency and is highly monochromatic. Further, since any light produced in any direction other than perpendicular to the surfaces 16 and 18 is allowed to pass through the side walls of the maser crystal or is absorbed thereat, the light oscillating back and forth between these surfaces is highly coherent. In the construction shown in FIG. 1, assuming that the surface 16 is completely opaque, and the surface 18 transmits 1.5% of the incident light, this small portion of the oscillating light in the cavity passes through surface 18 to produce a highly monochromatic coherent light output represented by the arrows 14. This output is applied to a filter 22, which filters all light except that at the desired frequency, and is then applied to a detector 24.

The device of FIG. 1 is a generator of electromagnetic waves since its function is to produce monochromatic coherent light at a predetermined frequency in response to the energy applied in the form of a light input represented by the arrows 12. The device of FIG. 2 is similar in construction to that of FIG. 1, but is more aptly termed an amplifier since its function is to amplify the intensity of a light input represented by arrows designated 14A during propagation in the cavity 10 and to produce the amplified output at the right hand side of the cavity as represented by the arrows 14B. For this type of operation it is necessary that both of the surfaces 16 and 18 transmit at least a portion of the light incident thereon. When operated in this mode, the pump energy, represented by the arrows 12, has an intensity below the threshold intensity so that, of and by itself, it is not sufficient to produce oscillation in the cavity. As a result, in the absence of light applied at the left hand side of the structure as represented by arrows 14A, only a low intensity output, produced primarily by spontaneous emission, is available at the right hand side of the structure. As explained above, in order to produce stimulated emission from the metastable state C to the ground state A, it is necessary that light waves having a predetermined frequency be present in the cavity. This frequency is characteristic of transitions between these two states. Therefore, the input light energy, represented by the arrows 14A, is of this characteristic frequency. The added energy applied to the device by this light input is sufficient to begin the process of stimulated emission, and thereby amplify the incoming signal. There is then available at the surface 18 an output of high intensity, monochromatic, coherent light 14B, which is an amplified version of the input represented by arrows 14A. This amplified output is passed through the filter 22 to a detector 24.

It should be apparent that the devices of FIGS. 1 and 2 may be combined with the output of light generator of FIG. 1, represented by arrows 14, applied as an input to the amplifying device of FIG. 2. Further, as is known in the prior art, represented by the above cited Patent 2,929,922, the output structure may be designed to include in place of the filter 22, a pair of double convex lenses separated by an absorptive sheet having an aperture lying in the focal place of the lens nearest the cavity. In this way, only the energy at the desired output frequency is passed through the aperture to the second lens which reconverts the energy at the desired frequency to a plane wave which may be radiated as an input to a detector, or as an input to an amplifier such as is shown in FIG. 2.

Figure 4:
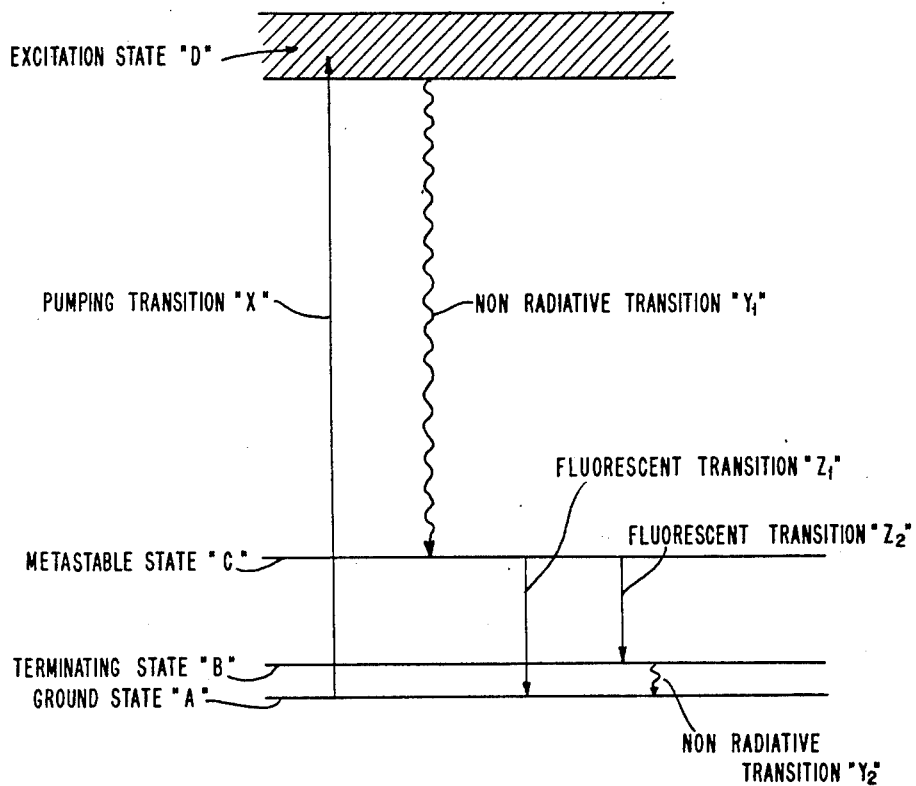
FIG. 4 is an energy level diagram depicting the characteristics of an embodiment of a maser material fabricated in accordance with the principles of the present invention.
Figure 5:
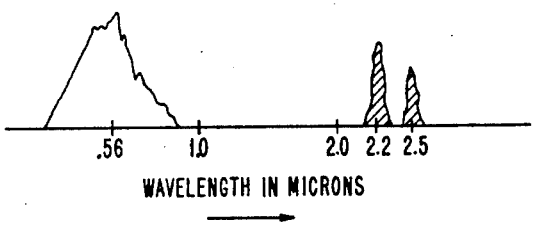
FIG. 5 shows a certain portion of the absorption and the fluorescent spectrum of the material whose energy level characteristics are depicted in FIG. 4.

FIGS. 4 and 5 represent the characteristics of one embodiment of an optical maser fabricated in accordance with the principles of the present invention. FIG. 4 is an energy level diagram representing the various energy states of the ions in the maser material, and FIG. 5 is a partial representation of the spectrum for the material. Referring first to FIG. 4, this energy state diagram includes four states, a ground state A, a terminating state B, a metastable state C and an excitation state D. Maser operation is achieved in a device having the energy level characteristics represented in FIG. 4 by applying input light energy to pump ions from the ground state A to the excitation state D. During this pumping operation, energy is absorbed by the maser material and these ions undergo a non-radiative transition represented by the arrow $Y_1$ to the metastable state C. From this point, spontaneous emission takes place as the ions undergo a transition from state C to the terminating state B, represented by arrow $Z_2$, and also from state C to the ground state A, represented by arrow $Z_1$. In the operation of the maser to produce the desired monochromatic coherent light output, the fluorescent transition from metastable state C to the terminating state B is employed and, it is in this transition that stimulated emission is built up to produce the desired oscillation in the cavity.

Referring to FIG. 5, which shows a portion only of the spectrum of the maser material whose energy level diagram is depicted in FIG. 4, the shaded areas at 2.2 and 2.5 microns represent fluorescent lines for the material. These fluorescent lines at 2.2 and 2.5 microns correspond, respectively, to the transition from the metastable state C to the ground state A and the transition from the metastable state C to the terminating state B. The band depicted in FIG. 5, centered at 0.56 micron, represents a typical excitation state which is evident as a wide band strong absorption in the maser material. This absorption at .56 micron, is in the green range of visible light and, therefore, the input pumping light applied to a maser device such as shown in FIGS. 1 and 2, using material having the characteristics depicted in FIGS. 4 and 5, includes visible light in the green wave band.

The basic difference between the characteristics of the maser material of FIG. 4, which represents one embodiment of the invention to which this application is directed, over those of the prior art as shown in FIG. 3, is that the stimulated emission is produced between states C and B, rather than between state C and ground state A to produce the desired maser operation. As was pointed out above, when the maser is in a quiescent state, that is in the absence of input pumping energy, the population of the various states is such that almost all of the ions in the material are in the ground state A. Further, in order to produce the desired stimulated emission and resulting oscillation to realize a high intensity coherent output, it is necessary to supply sufficient energy to achieve a population inversion between the two states which produce the fluorescent transitions at the output frequency. Where these transitions are produced from a metastable state C to a ground state A, as shown in FIG. 3, it is necessary that a very large number, that is more than half, of the ions initially present in the ground state be pumped into the excitation state and then relax back to the metastable state C before such an inversion can be achieved. Succinctly stated, for population inversion, it is necessary that there be a larger number of ions in the higher energy metastable state than in the lower energy state to which the transition is to occur to produce the desired emission. Where this transition is from the metastable state directly to the ground state, which is highly populated, it is obvious that an extremely large number of ions must be pumped from the ground state A to the excitation state D. However, with a material having the energy level characteristics depicted in FIG. 4, where the fluorescent transition utilized to produce the output is from the metastable state C to the terminating state B above the ground state, much less pumping energy is required to exceed the threshold for the material and produce the desired oscillation. This is so because in the quiescent condition, that is in the absence of pumping energy, the terminating state B is essentially depopulated and, therefore, only a relatively small number of ions need be pumped to the excitation state and leak back to the metastable state C in order to achieve a population inversion or negative temperature, as defined in U.S. Patent 2,929,922 between states C and B.

As was stated above with reference to FIG. 4, the ions, once they reach the metastable state C, may undergo spontaneous emissions both to the ground state A and terminating state B. However, as the input pumping energy is increased, a condition is rapidly reached wherein there is a sufficient population inversion between the higher energy state C and lower energy state B to produce stimulated emission between these states. This stimulated emission rapidly increases the energy of the light propagated along the cavity, as depicted in FIGS. 1 and 2, and oscillations at the characteristic wavelength for this transition from state C to state B, 2.5 microns, build up in the cavity. This population inversion between states C and B is attained with a much smaller pumping energy than would be required to produce a sufficient population inversion for stimulated emission between states C and A, and being reached first as the pumping energy is built up, the transition from state C to state B is favored and causes continued stimulated emission between these states resulting in oscillation so that there are only a small number of ions which undergo the less favored transition from state C to state A. This small amount of spontaneous emission in this less favored transition from state C to state A is at the wavelength 2.2 microns.

As was pointed out above, oscillation in the cavity formed by the maser material, whose characteristics are depicted in FIGS. 4 and 5, is realized for a relatively small energy input pumping signal because of the very low population of the terminating state B, thereby requiring the pumping of only a relatively small number of ions to achieve a population inversion between state C and state B. This effect is enhanced by cooling the material to very low temperature, preferably below liquid nitrogen temperature. By this cooling, the population of ions in the terminating state B is further depleted and almost all of the ions are in the ground state A. When cooled in this manner, only a very small amount of input pumping energy is required to achieve a population inversion between the metastable state C and the terminating state B necessary for the desired stimulated emission resulting in the cavity.

The energy level diagram of FIG. 4 includes one further non-radiative transition not present in that of FIG. 3 and that is the transition designated $Y_2$ from the terminating state B to the ground state A. This transition occurs for those ions which have undergone a fluorescent transition from state C to state B, and it is characteristic of the preferred maser material that the rate at which these non-radiative transitions take place is greater than the rate of fluorescent transitions from metastable state C to terminating state B. This is an important feature of the material since, if the decay from state B to ground state A is slow, the population of state B is rapidly built up, thereby making it necessary, if population inversion between states B and C is to be maintained, to apply much more pumping energy. Further, even in the presence of increased pumping energy, if the decay rate from state B to state A is slow, the population at state B would build up, thereby making continuous operation of the device impossible.

Optical masers having energy characteristics such as are shown in FIGS. 4 and 5 have been fabricated with host crystals doped with a small amount of trivalent uranium. The trivalent uranium ion in the crystal lattice provides at least one strong absorption band, as is indicated in FIG. 4, at D, required if the crystal is to absorb sufficient energy from the input light to produce the desired stimulated emission. Further, the trivalent uranium provides extremely narrow fluorescent lines such as those indicated at 2.2 and 2.5 microns in FIG. 5, and these lines become even narrower at extremely low temperature. Narrow fluorescent lines are important since the narrower the line, the more favorable are the conditions for achieving monochromatic, coherent light output. Further, with the trivalent uranium ion, not too many competing fluorescent transitions are produced. In the competing fluorescent transitions are produced. In the energy level diagram of FIG. 4, the transition from metastable state C to terminating state B is the one which is utilized to produce the desired output. The only competing transition shown is that from the metastable state C to ground state A. Though crystals doped with trivalent uranium may include another energy state above state C, from which fluorescent transitions could take place, both to terminating state B and ground state A to produce two more fluorescent lines in the spectrum, not shown in FIG. 5, these competing transitions are still small in number and do not have any appreciable deleterious effect on the number of ions available for transitions from state C to state B which produce the output.

The trivalent uranium ion provides the intermediate state B between the metastable state C and ground state A and this is a characteristic of this ion. The presence of the terminating state B and the fact that the fluorescent transition which is stimulated terminates in this state rather than in ground state A, makes it possible to produce oscillation in the crystal cavity with a relatively small amount of input pumping energy. Further, since the uranium ions relax from the terminating state to the ground state at a rate faster than the rate of transitions from the metastable state to the termination state, continuous wave operation is realizable. Uranium ions also produce, as is evident from the diagram of FIG. 5, extremely strong fluorescent transitions, thereby facilitating the stimulated emission required of an optical maser.

The crystal which serves as the host lattice to be doped with the trivalent uranium should have good optical quality to thereby prevent scattering and absorption of light waves propagated along the axis of the cavity. The crystal should also be one into which the impurity ion, trivalent uranium, may be easily introduced. The host crystal should also have a high degree of symmetry and it is preferable that it be cubic and, therefore, exhibit an isotropic index of refraction. These criteria are satisfied by a number of host crystals among which may be numbered the alkaline earth fluorides, including calcium fluoride, barium fluoride and strontium fluoride. Crystals of each of these materials satisfy each of the above criteria. They have good optical quality; the divalent calcium, barium and strontium ions have a radius which is very close to that of the trivalent uranium ion, thereby allowing the latter ion to substitute easily in the crystal lattice. Crystals of these materials are cubic and, therefore, cavities such as shown in FIGS. 1 and 2, fabricated of these crystals doped with trivalent uranium have a high degree of symmetry and an isotropic index of refraction. This being the case, the direction in which the crystal is cut in forming the desired cavity is unimportant since any geometrical distortion in the material does not change the propagation characteristics as long as the reflecting surfaces 16 and 18 are parallel to each other. Thus, with these crystalline materials, even though the crystal axis is not exactly perpendicular to the reflecting surfaces, as a result of twinning or shape distortion in the crystal, the isotropic index of refraction in the cubic crystal allows for propagation without undue losses or the production of unwanted modes as could occur in an anisotropic crystal.

Therefore, though anisotropic crystals doped with trivalent uranium may be utilized in practicing the invention, cubic host crystals, such as those mentioned above, having an isotropic index of refraction, are preferred.

The energy level diagram of FIG. 4 and the spectrum diagram of FIG. 5 actually represent certain of the characteristics of a calcium fluoride crystal doped with .05% trivalent uranium. This crystal has a strong absorption band centered at .56 micron which corresponds to light in the green portion of the spectrum. This material also possesses a high degree of absorption in the blue (not shown) and varying degrees of absorption in other portions of the visible spectrum and, therefore, is capable of being easily pumped with visible light, including blue and green components. This calcium fluoride crystal doped with .05% trivalent uranium exhibits the fluorescent lines at 2.2 and 2.5 microns, shown in FIG. 5, and two other fluorescent lines at 2.15 and 2.4 microns, resulting from the transitions from another energy level (not shown) to states A and B. However, with only these two fluorescent transitions and that from metastable state C to ground state A competing with the preferred transition from metastable state C to termination state B, by far the largest number of ions are available for the favored transition from metastable state C to terminating state B.

Barium fluoride and strontium fluoride when doped with trivalent uranium exhibit similar energy level characteristics differing in that the absorption and fluorescent bands in these crystals do not correspond exactly in wavelength to those for calcium fluoride crystals. Each of these crystals when doped with trivalent uranium exhibits a strong absorption band in the visible light portion of the spectrum, only a small number of competing fluorescent transitions, and at least one intense fluorescent transition from a metastable state to a terminating state above the ground state as indicated in FIG. 4 which can be stimulated to produce maser operation in response to a relatively small amount of input pumping energy.

Figure 6:
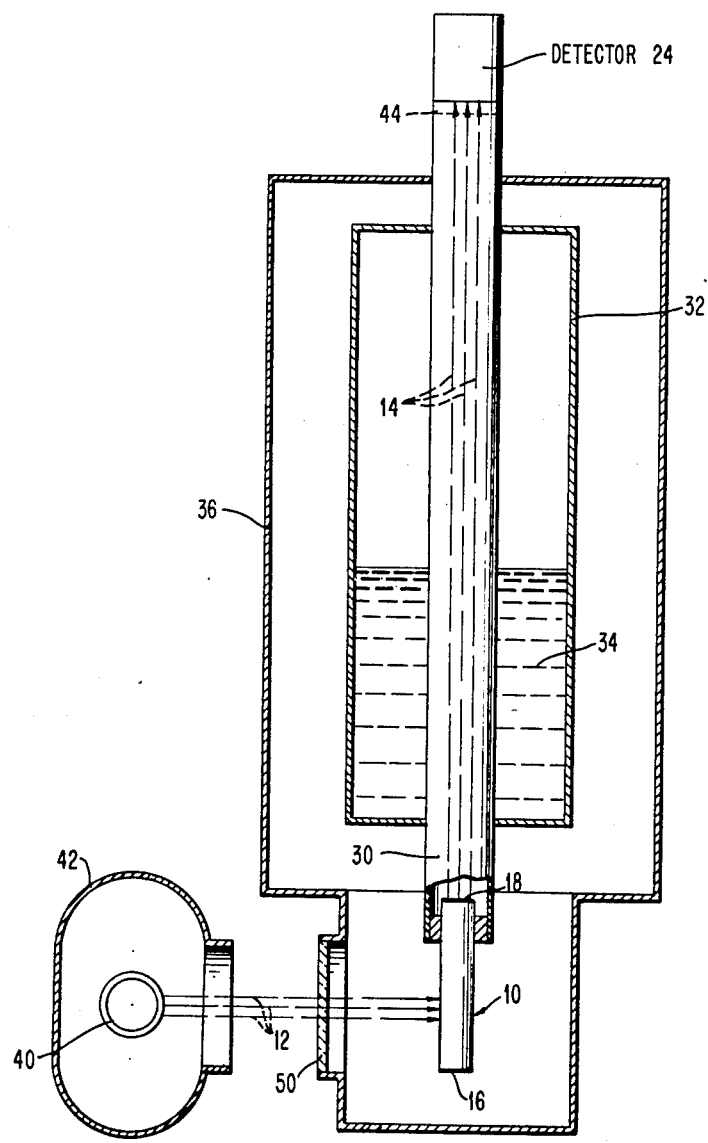
FIG. 6 is a somewhat schematic representation of one embodiment of the subject invention wherein a calcium fluoride crystal doped with trivalent uranium is maintained at a temperature close to liquid helium temperature and operated to produce a monochromatic coherent infrared output.

FIG. 6 is a somewhat diagrammatic representation of one embodiment of an optical maser device constructed in accordance with the principles of the invention and operated at an extremely low temperature. In this figure, designations corresponding to those used in FIGS. 1 and 2 are used to identify like components. Therefore, numeral 10 designates the crystal cavity having reflecting surfaces 16 and 18. The crystal is the calcium fluoride crystal doped with trivalent uranium whose characteristics are represented in FIGS. 4 and 5 and was prepared in the following manner.

Selected and purified pieces of calcium fluoride are placed in a graphite crucible together with a measured amount of uranium metal. A small amount (about 2%) of lead is also added to the mixture. The mixture is heated slowly to a temperature above the melting points of both the calcium fluoride and the uranium metal. At this elevated temperature, the lead reacts with the oxygen present to form lead oxide which has a high vapor pressure and, is, therefore, easily pumped away. All of the lead originally added to the mixture is used up in this way so that there is not trace of lead in the end product. This occurs as the crystal is being grown in the graphite crucible and provides a highly reductive atmosphere during the growing process. The crucibles are designed to provide a crystal of calcium fluoride which is cylindrical in shape, having a radius of about ¼ inch, and a length of about 3 inches. The crystal is red in color. After the crystal is prepared in this manner, it is cut down to a diameter of about ⅜ inch and a length of about 1½ inches. The ends of the crystal are then polished to a flatness of 1/20 sodium wavelengths and made parallel to within 15 seconds of an arc across the end surfaces. The cylindrical surface is left rough ground. Finally, the ends of the crystal are silvered and then covered with a protective optical coating of silicon monoxide to prevent oxidation of the silver. One of the two ends, specifically end 16, as shown in FIG. 6, is made completely opaque and the other end is silvered in such a way that it transmits 1.5% of light incident thereon. The silicon monoxide coating has a thickness, as measured, of approximately one-half wavelength at 2.5 microns.

The crystal, which forms the cavity 10 having the reflecting surfaces 16 and 18, as prepared above, is mounted as shown in FIG. 6 in a long cylindrical tube 30, which is mounted in a dewar vessel having an outer surface 36 and an inner container 32 which is about half filled with liquid helium 34. A vacuum is maintained in the space between the liquid helium container 32 and the outer surface 36. The crystal cavity 10 is mounted with its surface 18, which is capable of transmitting 1.5% of incident light, inside the cylindrical tube 30. This tube is also evacuated. Since the tube 30 passes through the liquid helium 34 in container 32, this tube is essentially at 4.2° K., which is the boiling point for liquid helium at atmospheric pressure. The mounting for the cavity 10 in tube 30 is brass so that the crystal is at a temperature very close to liquid helium temperature.

The operation of the device is similar to the operation described with reference to FIG. 1. The pumping light input, represented by the arrows 12, is applied through a window 50 to the surface of the cylindrical cavity 10. This light is provided by a source 40, which is mounted in a light shield 42 to minimize losses. This light source is an xenon discharge lamp which is actuated under the control of a bank of condensers that are first charged and then discharged when the lamp is triggered. The output coherent light produced by the cavity 10 is, as before, represented by the arrows 14, and this light travels along the tube 30 to an output window 44 in the top of the tube and is applied to a detector 24 which, in the illustrative embodiment, includes a filter for filtering out outputs at other than the desired wavelength.

Figure 7A:
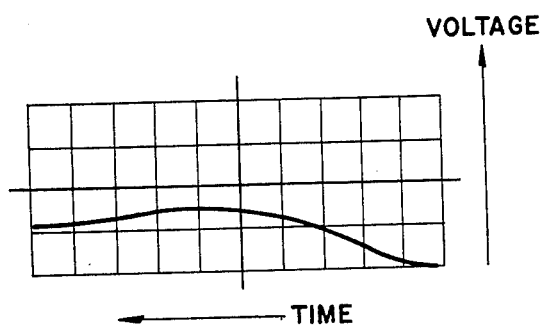
FIGS. 7A, 7B and 7C depict outputs obtained with an oscilloscope connected to the detector of the embodiment shown in FIG. 6.
Figure 7B:
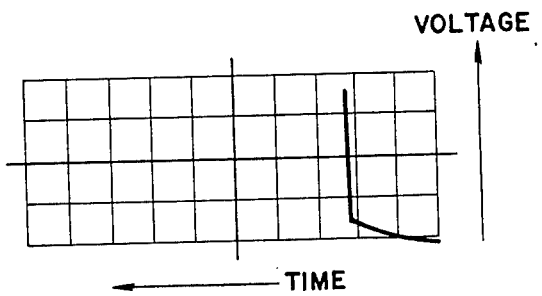
Figure 7C:
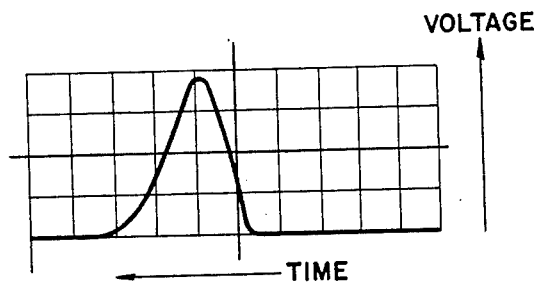

In order to provide a visual demnostration of the output of detector 24 in response to the light output from crystal 10, an oscilloscope may be connected to this detector in which case outputs as shown in FIGS. 7A, 7B and 7C are realized. FIG. 7A shows the voltage produced by the detector 24 in response to the light output from the device of FIG. 6 when the input pumping light supplied by source 40 is below the threshold intensity. FIG. 7B represents the voltage realized when the pumping light supplied by source 40 has an intensity above the threshold intensity for the device. As can be seen, the output voltage representative of the light output applied to detector 24 rises very sharply and, for the particular gain setting used, which is the same as that used for FIG. 7A, is so large as to exceed the range of the oscilloscope. It is estimated that this output has a magnitude greater than that produced by the spontaneous emission and background scattered light, as plotted in FIG. 7A, by a factor of about one thousand. FIG. 7C depicts the same output as that shown in FIG. 7B with the gain of the oscilloscope appreciably reduced. As can be seen from the right hand portion of this curve, the gain setting is such that the output, before the threshold intensity is exceeded, appears essentially as a zero output, compared with the very large output indicated after the threshold intensity has been exceeded.

The specific calcium fluoride crystal doped with .05%, described above, produces an output in the infrared region having a wavelength of 2.5 microns. Further, the output frequency shifts somewhat as the amount of doping of the host crystal is changed. Thus, for example, when the calcium fluoride crystal is doped with .1% of trivalent uranium, the infrared output has a characteristic wavelength somewhat greater than 2.5 microns. As the amount of the trivalent uranium added as an impurity is increased, the absorption of the crystalline maser material is also increased and, thus, for impurity concentrations greater than .3%, a large portion of the input energy is absorbed in the outer surface of the crystalline material. Therefore, for devices having the dimensions in the ranges indicated above, it is preferable that the amount of trivalent uranium impurity be less than .3% or that the cavity radius be decreased.

From the above description, it is apparent that, in accordance with the principles of the present invention, optical devices are provided having characteristics which have not been heretofore realizable. This is made possible by the characteristics of the trivalent uranium ion when used as a doping material. These trivalent uranium masers exhibit strong pumping bands and intense fluorescent lines. Further, they are excitable with relatively low input power by stimulating transitions to a termination state above the ground state, and are capable of either intermittent or continuous wave operation. By proper choice of material and the amount of doping, not only are outputs in the infrared realizable but at different wavelengths in the infrared. By using host crystals having cubic lattice structures, the optical properties of the devices are greatly enhanced because of the isotropic index of refraction exhibited by masers prepared in this manner.

It will, of course, be apparent to those skilled in the art that devices embodying the subject invention may be used in other applications than those illustrated in FIGS. 1 and 2. As one example, the device may be operated in such a way that one light input supplying the pumping light supplies sufficient energy to maintain the device just below its threshold and the device is triggered into oscillation by the selective application of another light source of sufficient light energy to cause the threshold to be exceeded.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A maser device for producing coherent radiation comprising; means for forming a resonant structure for said coherent radiation; a body of maser material disposed within said resonant structure means; means for applying input radiation to said body for producing coherent output radiation by stimulated emission in said body; and output means for receiving said output coherent radiation from said body; said body comprising a crystal doped with trivalent uranium.

2. A maser device for producing coherent radiation comprising; means for forming a resonant structure for said coherent radiation; a body of maser material disposed within said resonant structure means for producing coherent output radiation by stimulated emission in said body; said body comprising a crystal doped with trivalent uranium in which said stimulated emission is produced by ionic transitions of said trivalent uranium between first and second energy states in said crystal both of which are above the ground energy state of said trivalent uranium in said crystal; means for exciting said trivalent uranium so as to produce a sufficient population inversion between said first and second energy states to provide stimulated emission of said cohernt radiation in said crystal, and means for extracting said coherent radiation from said resonant structure means.

3. A maser device for producing coherent radiation comprising; means for forming a resonant structure for said coherent radiation; a body doped with trivalent uranium disposed within said resonant structure means; means for applying input radiation to said body for producing monochromatic, coherent output radiation from said body by stimulated emission in said body of ionic transitions of said trivalent uranium from a first energy state to a second energy state in said body, both of which states are above the ground energy state for said body; and output means for receiving said output coherent radiation from said body.

4. The device of claim 3 wherein said crystal is cubic.

5. The device of claim 4 wherein said crystal is an alkaline earth fluoride crystal.

6. The device of claim 5 wherein said crystal is barium fluoride.

7. The device of claim 5 wherein said crystal is strontium fluoride.

8. The device of claim 5 wherein said crystal is calcium fluoride, and said output coherent light has a wavelength in the infrared portion of the spectrum.

9. The device of claim 8 wherein said crystal is calcium fluoride and is doped with about .05% of trivalent uranium.

10. The device of claim 8 wherein said crystal is calcium fluoride and is doped with about .1% of trivalent uranium.

11. In an optical maser device for continuously producing coherent output radiation by continuous stimulated emission in a crystal maser material; means for forming a resonant structure for said coherent radiation embracing said crystal maser material; means maintaining said crystal at a temperature below that of liquid nitrogen; said crystal being doped with trivalent uranium to exhibit a strong absorption band, a ground energy state, and first and second other energy states both of which are above said ground energy state; said stimulated emission being produced by fluorescent ionic transitions of said trivalent uranium from said first energy state to said second energy state; said first energy state being populated by applying energy to pump trivalent uranium ions from said ground state to said absorption band which ions then undergo a non-radiative transition to said first state; said ions undergoing non-radiative transitions from said second energy state to said ground state at a faster rate than said fluorescent transitions from said first energy state to said second energy state; whereby continuous stimulated emission is produced in said body by the continuous application of input energy to said body, and means for extracting said coherent radiation from said crystal maser material.

12. A maser device for producing coherent radiation comprising; means for forming a resonator for said coherent rediation; a crystal doped with trivalent uranium disposed within said resonator means; means for producing emission from said doped crystal by stimulating fluorescent ionic transitions of said trivalent uranium between different energy states in said crystal; and output means responsive to said emission.

13. A maser device for producing coherent radiation comprising; means for forming a resonator for said coherent radiation; a calcium fluoride crystal doped with a small amount of trivalent uranium disposed within said resonator means; means for producing infrared emission from said doped crystal by stimulating fluorescent ionic transitions of said trivalent uranium between different energy states in said crystal; and output means responsive to said infrared emission.

14. A maser device for producing coherent radiation comprising; means forming a resonator for said coherent radiation; a crystal having an isotropic index of refraction doped with trivalent uranium disposed within said resonator means; means for producing emission from said doped crystal by stimulating fluorescent ionic transitions of said trivalent uranium between different energy states in said crystal; and output means responsive to said emission.

15. An optical maser device comprising; a crystal doped with trivalent uranium whereby said doped crystal exhibits strong absorption bands in the visible portion of the spectrum and a fluorescent band in the infrared portion of the spectrum; said fluorescent band being produced by ionic transitions of the trivalent uranium from a first energy state to a second energy state both of which are above the ground energy state for said trivalent uranium in said crystal; means forming a resonator at said fluorescent band containing said doped crystal; means for cooling said crystal to thereby narrow said fluorescent band and decrease the population of said second energy state relative to said ground state; input means for producing stimulated emission in said crystal by causing stimulating ionic transitions of said trivalent uranium from said first energy state to said second energy state; and output means responsive to said emission.

16. The device of claim 15 wherein said crystal is in the form of a rod having parallel ends and wherein said resonator means includes a pair of mutually parallel plates both of which are at least partially reflecting.

17. The device of claim 15 wherein said crystal is cubic.

18. The device of claim 17 wherein said crystal is an alkaline earth crystal.

19. The device of claim 18 wherein said crystal is a calcium fluoride crystal doped with trivalent uranium and said emission produced by said stimulated transitions is in the infrared.

20. A solid state maser for producing coherent radiation of a given optical frequency in the electromagnetic wave spectrum comprising means forming an optical resonator for said coherent radiation, a negative temperature medium disposed within said resonator means and having a plurality of individual ions each characterized by a ground energy level and at least three distinct energy levels above said ground level, two of said three energy levels having a separation corresponding to said given optical frequency and disposed between the third of said three energy levels and the ground level, means for exciting said ions to the third of said three energy levels so as to produce a negative temperature with respect to said two energy levels causing stimulated emission of said coherent radiation and means for extracting said generated coherent radiation from a surface of said medium.

21. A maser device for producing coherent radiation of a given optical frequency in the electromagnetic wave spectrum comprising a solid state host material including ions each of which are characterized by a given absorption band of frequencies and by a ground energy level and a pair of energy levels above said ground level between which stimulated emission is produced at said given optical frequency, means for applying pumping radiations within said absorption band of frequencies to said ions so as to produce a population inversion between said pair of energy levels to cause stimulated emission of said coherent radiation, means for forming a reasonant structure for said coherent radiation and means for emitting said coherent radiation from said resonant structure means.

22. A maser device for producing coherent radiation of a given optical frequency in the electromagnetic wave spectrum comprising means forming an optical resonator for said coherent radiation, a host medium disposed within said resonator means and having ions each characterized by a ground energy level and first, second and third energy levels each above said ground level, an ionic transition between said first and second energy levels being instrumental in producing the coherent radiation by stimulated emission, means for exciting said ions to the third of said three energy levels so as to create a population inversion with respect to said first and second energy levels producing stimulated emission of coherent radiation within said medium and means for extracting a portion of said coherent radiation from said medium.

23. A device as set forth in claim 22 wherein ionic transitions from said third energy level to said first energy level and from said second energy level to said ground energy level are non-radiative transitions.

24. A maser device for producing coherent radiation of a given optical frequency comprising a medium including trivalent uranium ions, means for exciting said ions to create a population inversion producing stimulated emission of coherent radiation within said medium, means for forming a resonant structure for said coherent radiation and means for extracting said coherent radiation from said resonant structure means.

References Cited in the file of this patent

The Luminescence of Trivalent Uranium, by Galkin, L. N. et al. from Soviet Physics "Doklady," volume 2, No. 1, pages 255, 256, 257; 1957.